310-13 SR

FIP8502 OR 3,586,891

[redacted]

[11] 3,586,891

[72] Inventors Roy A. Applequist
San Jose;
Laurence M. Wilson, Los Gatos, both of, Calif.

[21] Appl. No. 18,020
[22] Filed Feb. 26, 1970
Division of Ser. No. 715,237, Mar. 22, 1968, Pat. No. 3,544,980.
[45] Patented June 22, 1971
[73] Assignee Memorex Corporation
Clara, Calif.

[54] MAGNETIC RECORDING DISC DRIVE
2 Claims, 12 Drawing Figs.

[52] U.S. Cl. .......... 310/13, 310/27
[51] Int. Cl. .......... H02k 41/02
[50] Field of Search .......... 310/12, 13, 14, 15, 27; 318/135; 335/222; 340/17

[56] References Cited

UNITED STATES PATENTS

| | | | |
|---|---|---|---|
| 3,470,399 | 9/1969 | Johnson et al. | 310/13 |
| 2,835,832 | 5/1958 | Efromson | 310/27 |
| 3,176,170 | 3/1965 | Fulton et al. | 310/12 |

OTHER REFERENCES

N. G. Smeltzer, "Linear Actuator," IBM TECHNICAL DISCLOSURE BULLETIN, Vol. 4 No. 3, August 1961

*Primary Examiner*—D. F. Duggan
*Assistant Examiner*—B. A. Reynolds
*Attorney*—Limbach, Limbach & Sutton

ABSTRACT: An apparatus for linear positioning of magnetic recording heads in a disc-type recording machine containing a linear positioning motor which converts an electrical address signal directly into linear motion, a rack and pawl mechanism for locking the recording heads at predetermined locations over the recording surface, a stationary cam cooperating with a loading ramp on a head access arm for direct head loading and unloading as the access arm is moved radially of the disc, and a recording head suspension which permits the heads to be loaded at the peripheral, high speed area of the disc rather than the central low speed area, while eliminating the need for control of tolerances during assembly of the apparatus.

INVENTORS
ROY A. APPLEQUIST
LAURENCE M. WILSON
Limbach Limbach & Sutton
ATTORNEYS INVENTORS
ROY A. APPLEQUIST
LAURENCE M. WILSON
Limbach Limbach & Sutton
ATTORNEYS INVENTORS
ROY A. APPLEQUIST
LAURENCE M. WILSON
Limbach Limbach & Sutton
ATTORNEYS INVENTORS
ROY A. APPLEQUIST
LAURENCE M. WILSON
Limbach, Limbach & Sutton
ATTORNEYS

MAGNETIC RECORDING DISC DRIVE

This application is a division of our copending application Ser. No. 715,237, filed Mar. 22, 1968, now Pat. No. 3,544,980.

The present invention relates to magnetic recording machines and in particular to the mechanical apparatus in a disc-type recording machine.

The art of information storage has developed rapidly with constant improvements in the amount of information that can be stored on a particular media and in the time required for access to this stored information. For information that must be used frequently, but not in a fixed sequence, the time for retrieval becomes of primary importance. Retrieval of information stored at random on tape is excessively time consuming for some applications. Therefore, apparatus for magnetic storage on cylinders and discs has been developed in the art to permit random access to recorded information by direct positioning of a recording head containing a magnetic sensing transducer over the portion of the cylinder or disc containing the information sought. Disc drives in the present advanced state of the art contain disc packs having a number of discs stacked for rotation about a common axis. Read and record transducers are mounted in banks and adjustably extend over each of the recording surfaces of the discs on fingerlike access arms. The disc packs rotate at high speeds in the nature of 4,000 r.p.m. Accurate positioning of the recording heads both in normal distance from the recording surface and in radial distance from the axis of rotation is imperative. During high speed rotation of the discs there are created thin air layers which follow the disc surfaces. A properly designed and mounted recording head will "fly" on the air layers in close proximity with a disc surface. Since contact of the recording head with the coated disc surface can produce great damage to both the head and disc, design of the head and the manner in which it is mounted is critical.

Information is placed on the magnetic recording surface of the discs in concentric tracks. The vertical set of tracks in a disc stack or pack constitutes a storage cylinder. Each transducer in the head bank is positioned over the track on each recording surface of the disc pack forming the storage cylinder for a given linear position of the head bank. Selection of an individual track is accomplished electromechanically. Additionally, the tracks may be divided into sectors such that a segment only of the track may be selected for reading or recording. It is apparent that the narrower the tracks are made and the smaller the tolerence permitted between tracks, the greater will be the amount of information that can be stored on a given disc surface. The requirement of a highly reactive linear positioning mechanism that will not only have a low access time in retrieving stored information, but that will also be able to accurately position the recording head transducer in a narrow, predetermined track presents many problems. The mechanism must be sufficiently strong to withstand rapid accelerations and decelerations, yet be of great precision to allow the recording head to exactly locate and lock on the track selected.

SUMMARY

This invention integrates three primary features into an efficient direct-access disc-drive unit. The three primary features are as follows: a linear positioning mechanism directly responsive to an electrical signal which will rapidly seek the address of information desired, a detent mechanism that accurately locks the recording head bank in a fixed track, and a head support and mount assembly that positions the transducer carrying head at a predetermined distance from the recording surface of a disc.

The linear positioning motor comprises a stationary, permanent magnet and a movable cylindrical armature or bobbin which longitudinally slides in and out of the magnet housing responsive to the direction of current through the windings of the bobbin. An electrical address signal is therefore directly converted to linear motion providing faster access and eliminating functional depreciation caused by wear common in the complex mechanical, electromechanical or hydraulic systems. The linear positioning motor is rigidly connected to a carriage carrying a bank of recording heads eliminating all linkage tolerances. Elimination of mechanical systems that contain tolerances is of great import since all mechanical tolerances are directly reflected in the relative storage capacity of the disc. Mechanical tolerance adjustments are provided connecting each head to the linear positioning motor so that all of the heads can be positioned accurately and simultaneously by the motor while permitting the position of individual heads to be adjusted easily while the heads are reading information from a disc.

The detent mechanism operates in close cooperation with the linear positioning mechanism. A rack of teeth called the detent rack is mounted on the carriage carrying the head bank. Opposite the rack, mounted on the stationary frame, is a detent pawl. The detent pawl has two halves each of which has a set of four teeth of the same pitch as the rack. However, the two sets of teeth are arranged to be offset from one another by half their pitch. When the pawl is released to engage the rack only one set of teeth of the pawl will mesh with the teeth on the rack. This arrangement permits the carriage to be located in twice as many positions as there are teeth on the rack. Since design limitations prescribe the number of teeth that can effectively be used on a rack to lock the head bank in position, the novel double detent pawl enables the number of positions of the head bank, and hence the number of recording tracks, to be doubled.

Facing the detent rack is a variable reluctance transducer which senses the teeth of the detent rack to determine the position of the carriage on the track frame. The signal from the transducer regulates the seek velocity of the bobbin in the linear positioning motor initially accelerating the bobbin to high velocity and periodically slowing the bobbin as it approaches an intended reading and writing track, and when the proper address has been reached, deactivates the solenoid holding the spring loaded detent pawl out of lock, thereby dropping the pawl onto the rack locking the carriage in position. This positioning apparatus eliminates as many mechanical components as possible enabling a high access speed to be employed in the address seek operation while at the same time increasing the effective storage capacity of the discs.

The novel mounting of the transducer heads provides an assembly that is reliable because of its simplicity yet highly reactive because of its design. The head bank is mounted to the movable carriage and consists of 10 read/record heads attached to the ends of 10 support or access arms. Elemental in the design of the support arms are leaf springs which maintain a constant loading force on the heads when in operating position. A ramp is incorporated in each support arm which rides off a cooperating cam to lower the arm on the recording surface of a disc when the head bank is extended into the disc pack. Complex hydraulic or torsion loading systems are thereby eliminated.

The head shoe rides at the end of the support arm on a single point load pin in gimbal suspension to allow pivoting on any horizontal axis through the end of the pin. This permits the head to react to geometric imperfections in the recording surface of a disc while maintaining the desired normal distance from the recording track. Loading force is still controlled by the leaf spring, but the head is free to seek its own equilibrium position by the spring loaded gimbal suspension. This head support arrangement permits the head to be loaded at the peripheral, high speed area of the disc rather than the central low speed area which in turn makes practical the cam and ramp structure for loading and unloading the heads. The single point load pin is mounted on the head so that the point of load application is accurately positioned on the head regardless of inaccuracies in assembly of the head to the arms.

The three primary features briefly described above enable the combined unit to operate at reduced access times without the common mechanical failures of more complex systems. The combined unit also permits compact information storage by the precision positioning mechanisms. Other advantages and improved features will become apparent from the full disclosure of the invention described in the specification and illustrated in the accompanying drawings in which.

Figure 1:
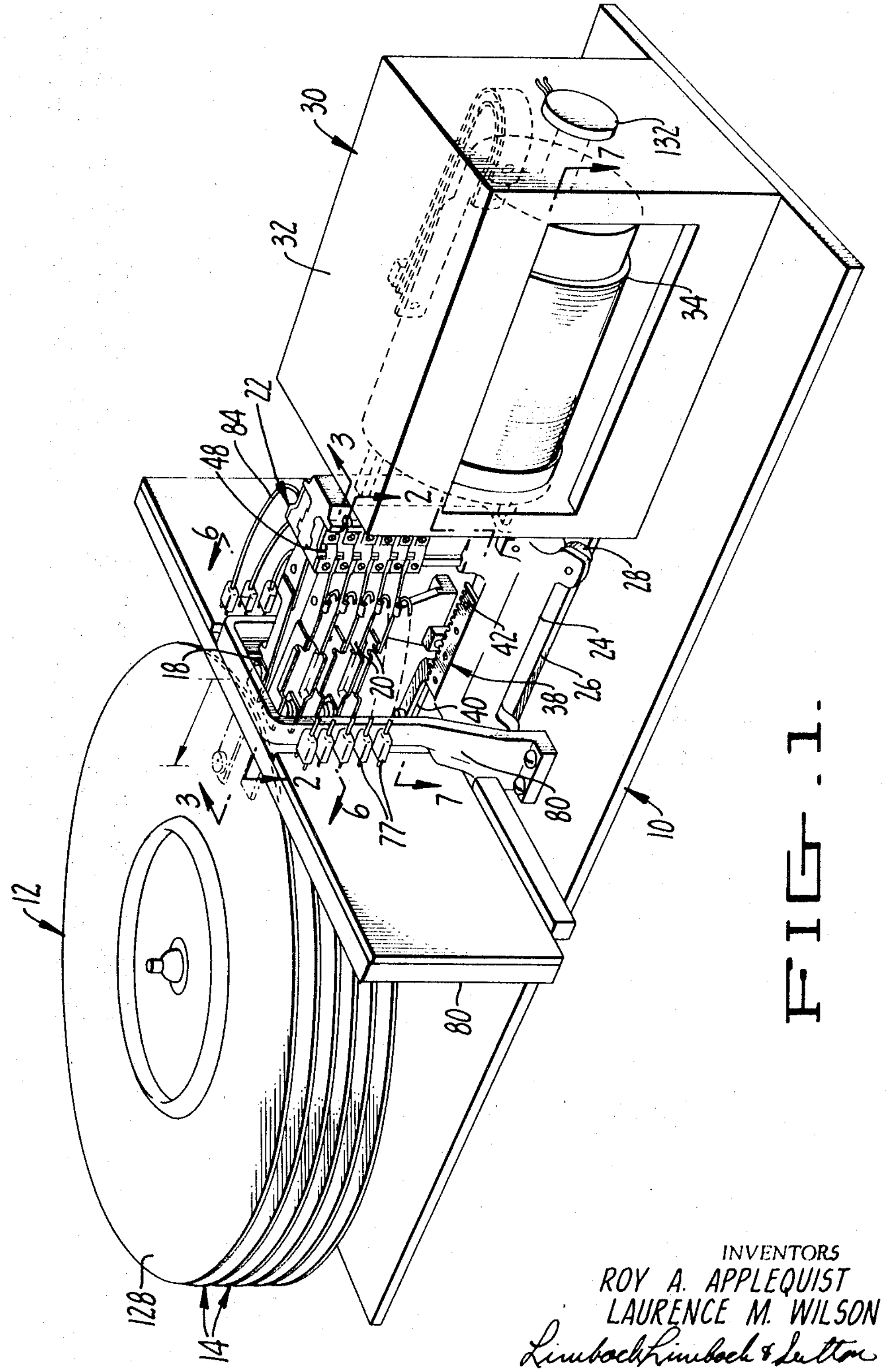
FIG. 1 is a perspective view of a complete disc drive unit.

Referring now in detail to the drawings and in particular to FIG. 1, the preferred embodiment of the disc drive unit 10 is illustrated in combination with a disc pack 12 of the advanced type developed in the art. Consideration of the basic elements illustrated in FIG. 1 will aid in understanding the interrelationship of the individual components illustrated by FIGS. 2 through 9 in the remaining drawings which hereafter are described in detail.

The disc pack 12 comprises six discs having a total of 10 recording surfaces 14 and is mounted as a unit on a spindle 16 of the disc drive unit 10. The disc pack 12 is a supply item and does not comprise an integral part of the drive unit 10. The spindle 16 and attached disc pack 12 are driven by a rotating drive motor (not shown) up to rotational speeds of 4,000 r.p.m.

Each of the recording surfaces 14 is coated with a magnetic film over which a recording head 18 relatively travels. The recording heads 18, only partially illustrated in FIG. 1, are mounted on support or access arms 20 and the ten head-carrying, access arms 20 form a recording head bank 22 which moves into and out of the disc pack as a unit. A pair of heads 18 enter the space between adjacent discs with one head operating on the underside of the upper disc and the other head operating on the upper side of the lower disc.

Figure 7:
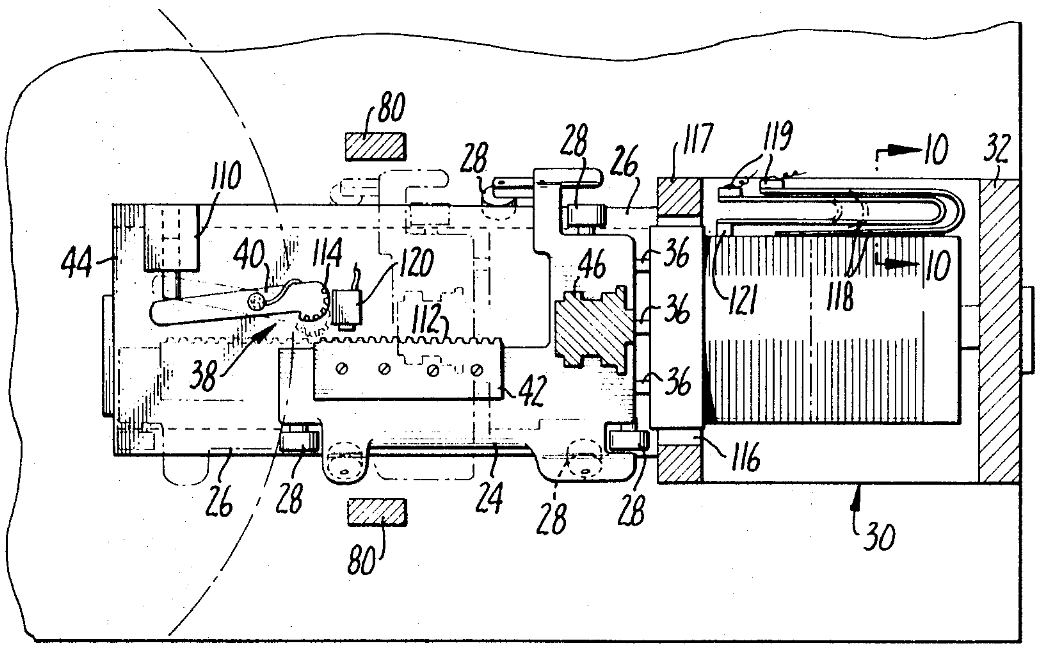
FIG. 7 is a sectional plan view of the linear positioning mechanism taken on line 7–7 of FIG. 1.

The head bank 22 is mounted to a freely rolling carriage 24 which travels back and forth on a hardened track 26 on three pairs of transversely opposed ball bearing rollers 28. The rollers 28, more clearly illustrated in FIG. 7, are mounted in pairs such that all vertical and horizontal motion except in the direction desired is eliminated.

Linear motion to the carriage 24 is imparted by a drive motor 30 which is comprised of a stationary, permanent magnet forming a housing 32 about a movable bobbin or armature 34. The bobbin 34 is directly fixed to the carriage 24 by three tabs 36, illustrated in FIG. 7. The carriage 24 is locked in position by activation of a detent mechanism 38 which drops a pawl 40 fixed to a stationary frame 44, FIG. 7, into a rack 42 attached to the movable carriage 24.

Figure 2:
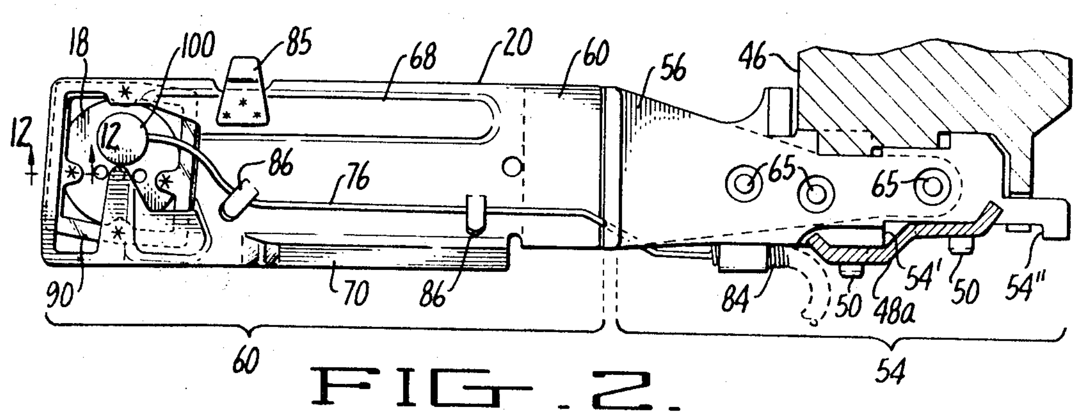
FIG. 2 is a partial plan view in section of an access arm and head assembly taken on line 2–2 of FIG. 1.
Figure 3:
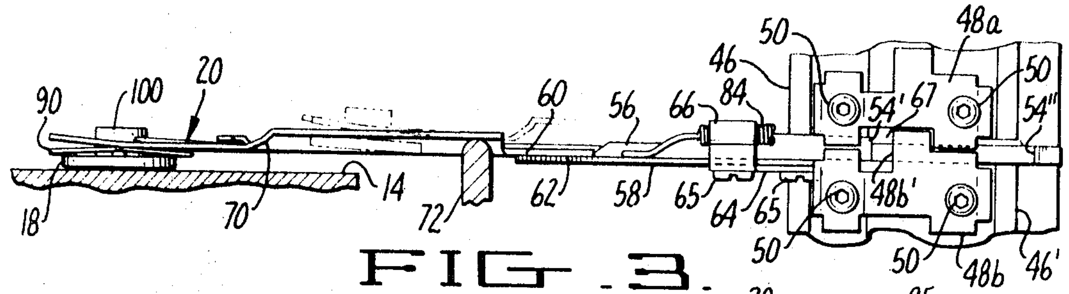
FIG. 3 is a partial side elevational view of an access arm taken on line 3–3 of FIG. 1.

Turning now in detail to FIG. 2, a recording head 18 and an access arm 20, typical of the head arm assemblies in the recording head bank 22 are therein illustrated. The access arm 20 is mounted to a T-bar 46 extending vertically from the carriage 24 by two cooperating face plates, 48*a* and 48*b*. The face plates 48*a* and 48*b* provide both a vertical spacer and a clamp for vertically adjacent access arms mounted to the T-bar. Each of the face places, 48*a* and 48*b*, is secured against the access arm by two bolts 50 which thread into the T-bar 46. A portion of the T-bar 46 with face plates 48*a* and 48*b* is shown in FIG. 3. A stem portion 54 of the access arm is comprised of three laminations to create an inflexible stem suitable for rigid mounting to the T-bar 46. The top lamination 56 of the access arm 20 shown in FIG. 3 is of approximately twice the thickness of the remaining two and is formed from a relatively rigid material. The center lamination is formed of a tempered steel and is a flat leaf spring 58. The leaf spring 58 extends beyond the top lamination 56 and attaches to the end portion 60 of the access arm by a lap joint 62. The bottom lamination 64 extends just briefly beyond the T-bar 46 with a corner tab bent to form a lead cable mount 66. The three laminations are secured together by a set of three bolts with nuts 67.

The face plates 48*a* and 48*b* and the stem portion 54 of the access arm 20 are specially designed to permit adjustment of each access arm 20 individually during operation of the drive unit 10 for centering the read/write transducer 100 over a recording track. By loosening the two bolts 50 on each face plate 48*a* and 48*b* securing an access arm 24 to the T-bar 45, the access arm, and hence the read/write transducer 100, may be moved toward or away from the center of the disc pack 12. For movement toward the center of the disc pack, a screwdriver-like adjustment tool is inserted into the gap 67 provided between two adjacent face plates 48*a* and 48*b*. Torsional leverage between the edge 48*b*′ of the face plate and a step 54′ in the stem portion 54 of the access arm will move the access arm toward the disc pack center. To move the access arm 20 and read/write transducer away from the center of the disc pack 12 the adjustment-tool leverage is applied against an edge of the T-bar 46′ and a tab 54″ at the extremity of the stem portion 54. After adjustment the bolts 50 are tightened and the access arm 20 is again locked in place.

The end portion 60 of the access arm may be fabricated from die-punched steel plate. A through 68 on the face of the plate is formed to balance the stiffening effect of a retraction ramp 70 on the opposite side thus preventing any twisting of the access arm when raised.

The leaf spring 58, integral in each access arm, maintains a constant loading force on the recording head 18 when in operating position. When the head bank 22 is withdrawn from the disc pack 12, the access arms 20 ride up on unload cams 72 such as the exemplar in FIG. 3. The unload cam 72 bears against the retraction ramp 70 countering the loading force of the flat leaf spring 58 and raising the recording head 18 well above its normal operating position as illustrated by the phantom lines in FIGS. 3 and 6. The unload cams are mounted on notches 78 in the inner wall of an arch 80 of the stationary frame as illustrated in FIG. 3. The arch 80 arcs over the hardened track 26 allowing the carriage 24 and head bank 22 to pass underneath. The arch 80 also provides a convenient mount for a circuit board 82 which extends from each outer wall of the arch 80 in the manner illustrated in FIG. 1. The location of the circuit board 82 allows the transducer lead wires 76 to be conveniently plugged into information circuitry by plugs 77 (FIG. 1) without fouling during carriage movement. The transducer lead wires 76 are encased in a stainless steel coil cover 84 of which a portion is shown in FIGS. 2 and 3. The coil cover 84 acts as both a protective cover and a flexible support for the portion of the transducer lead wires 76 running from the access arms 20 to the circuit board 82. That portion of the transducer lead wires 76 running from the recording heads 18 to the protective coil covers 84 is fastened to the access arms 20 by clips 86 punched in the access arms as FIG. 2 illustrates.

Figure 6:
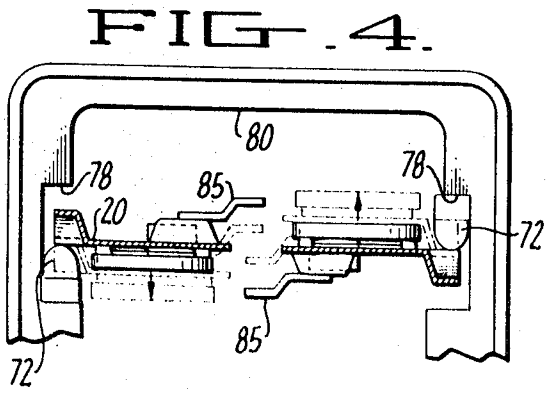
FIG. 6 is a cross-sectional view through the head-arm assembly taken on line 6–6 of FIG. 1.

A safety tab 85, FIG. 2, is placed at the edge of the surface of each access arm to prevent the heads from contacting the next adjacent upper or lower arm in the head bank 18 in the event the access arms are fully extended off the ramp 70 without the restricting surfaces of a disc pack present to restrain full flexure of the leaf springs 58. Since one access arm between two discs has its head facing up to read or write on the under side of a recording disc and the horizontally adjacent access arm faces down to record on the upper side of an adjacent recording disc, a tab placed on the edge of each arm in a collision course, as shown in FIG. 6, will prevent unrestricted movement of the arms when no disc pack is mounted on the drive unit 10.

Figure 4:
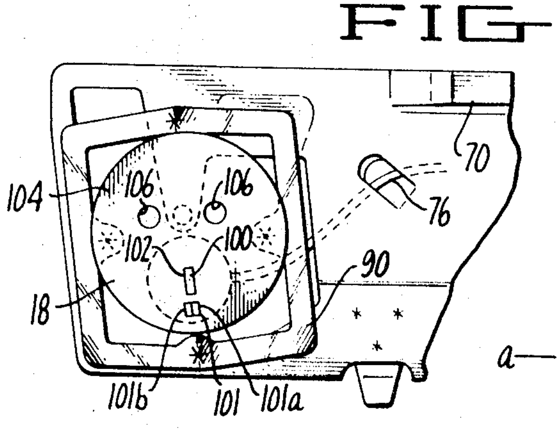
FIG. 4 is an enlarged plan view of the underside of the head assembly of FIG. 2.
Figure 5:
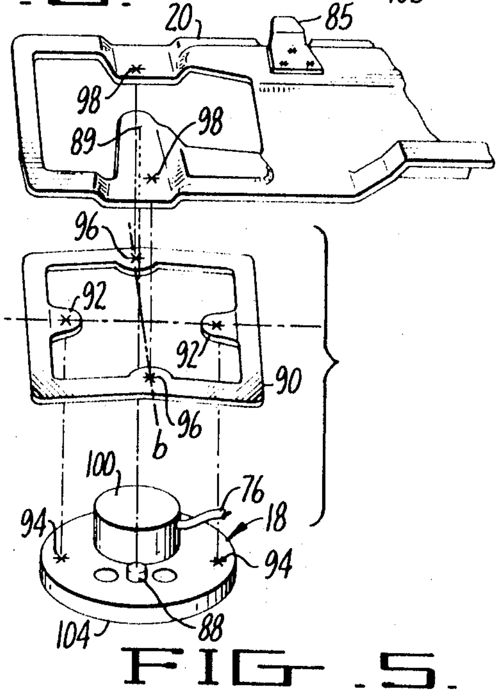
FIG. 5 is an exploded view of the head assembly of FIG. 4.

The unique manner of mounting a recording head 18 to an access arm 20 is best represented in FIGS. 4 and 5. The recording head 18 is in direct contact with the access arm 20 at only the single point at which a small pivot pin 88 fixed to the recording head 18 contacts a support portion 89 of the access arm. Since the point at which loading force is delivered to the head is critical in maintaining proper head flight, fixing the pivot pin 88 to the head 18 eliminates any tolerance problems encountered when the pin 88 is fixed to the access arm. If the pin were fixed to the access arm, maintaining a fixed point on the head at which the loading force is delivered would be difficult since the head is only resiliently connected to the arm and to a limited extent can "float" in its suspension. The direct, single point contact enables the integral leaf spring 58 of the access arm 20 to directly deliver a constant loading force to the head which does not change significantly in magnitude or location as the head moves in its gimbal. The direct-point contact feature of the present mount assembly provides substantial improvements over such earlier devices as those shown in Haughton U.S. Pat. No. 3,071,773 or Osterlund U.S. Pat. No. 3,051,954.

The actual suspension of the head 18 is accomplished by a square gimbal spring 90. The spring 90 becomes slightly deformed along two axes. The two opposing halves bisected by axis *a* in FIG. 5 become deformed slightly upward to form a very obtuse V and the two opposing halves bisected by axis *b* in FIG. 5 become deformed slightly downward to form a very obtuse inverted V. Two tabs 92 on the inner periphery of the square spring 90 are spot welded to two opposed points 94 on the upper surface of the recording head 18 along the axis *a*. Where the recording head is made of a ceramic material to which the metal spring cannot be welded, the recording head is drilled at points 94 with undercut blind holes, and metal inserts with sloping sidewalls are secured in the holes with epoxy resin so that the tabs may be welded to the metal inserts. Two remaining tabs 96 on the spring 90 are spot welded to opposed points 98 at the end of the access arm 20 along the *b* axis. Often a head is constructed of a ceramic material. The difficulty of attaching the gimbal spring to a ceramic recording head may be solved by inserting two small metallic plugs 91 into holes in the ceramic shoe of (See FIG. 12) the recording head. The plugs 91 each have a circular groove in the hole of the shoe and are maintained in place by an epoxy resin which extends into the groove. The gimbal spring 90 is then spot welded to the head at two points 94 on the two metallic plugs 91. As the flat spring 90 is attached to both the access arm 20 and to the recording head 18, placement of the pin 88 on the head between head and the support portion 89 of the access arm causes the desired deformation of the spring 90. The gimbal spring 90 permits the head to flex universally with respect to the arm 20 at a flexure point where the *a* and *b* axes intersect, and the pivot pin 88 is located adjacent to though not exactly coincident with the flexure point.

The above described suspension allows the recording head 18 to be in a gimbal suspension and free to rock about any horizontal axis through the contact point of the pivot pin 88. Since rocking will be opposed by the spring action of the square spring washer 90, the head will have a quick recovery from any head disorientation caused by geometric imperfections in the recoding surface of a disc.

Though the recording head 18 is in a torsional suspension, the actual loading force remains directed from the leaf spring 58 of the access arm. The recording head 18 carries a read/write transducer 100 which is mounted in a slot 102 in the shoe portion 104 of the recording head 18. To increase the stability of the recording head when floating over a rotating disc, two air holes 106, FIG. 4, pierce the shoe portion 104 of the head providing a relief for air trapped under the shoe. In addition to aiding stability they permit the recording head 18 to come in closer spaced relationship with the recording surface 14, permitting a lighter loading force to be used to maintain the proper ultimum distance between head 18 and recording surface 14, for pickup of recording.

The recording heads 18 are mounted slightly skew to a cross-line of the direction of access arm mounting as illustrated in FIG. 4. Access arms 20 are mounted in pairs along each side of the T-bar 46, FIG. 1, one of the pair having its head facing up to read or write on the underside recording surface of a disc in the disc pack 12 and the other in the pair having its head facing down to read or write on the upper side recording surface of a disc. Since neither is mounted radially to the center of the disc pack the recording heads 18 and hence the contained read/write transducers 100 are skew mounted to lie approximately tangent to concentric recording tracks in the disc pack 12.

Turning now to FIG. 7, the apparatus for linear positioning can be considered in greater detail. The plan section of FIG. 7 illustrates the carriage 24 in its withdrawn position. In this position, the access arms 20 would be fully removed from the disc pack 12. Since the only time that the pawl 40 need be disengaged from the rack 42 is during a seek operation in which a new head position is being located, the pawl is spring loaded by coil springs 108 to lock on the rack 42 when the detent mechanism 38 is in a deactivated state. The spring loading is provided by coil springs 108 attached at one end to a pivot shaft 109 and at the other end to the detent pawl 40. A bistable actuator 110 is switched at the commencement of a seek operation to release the pawl from rack 42 and when the address (head position) sought is located, the actuator 110 is pulsed in reverse, dropping the spring loaded pawl 40 into the rack 42 and locking the head bank 22 in the desired position.

Figure 8:
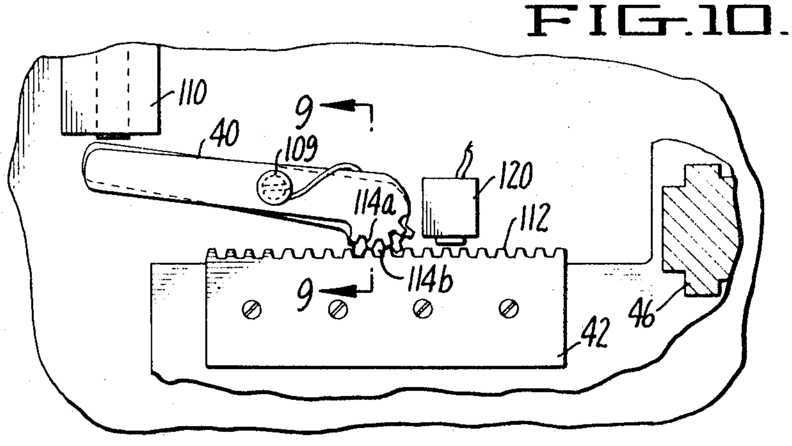
FIG. 8 is an enlarged plan view of the detent mechanism illustrated in FIG. 7.
Figure 9:
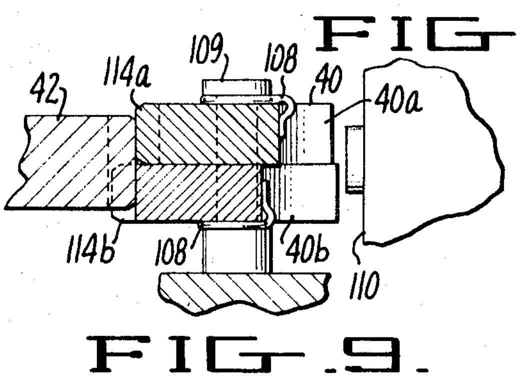
FIG. 9 is an enlarged sectional view of the detent mechanism taken on line 9–9 of FIG. 8.

The detent rack contains more than 100 teeth 112 (fewer illustrated in FIGS. for clarity) which provide more than a hundred positions at which the head bank 22 may be located. In the embodiment disclosed, the novel detent pawl 40 permits the head bank 22 to be positioned at twice the number of locations as there are teeth on the detent rack 42. The detent pawl 40 is split into two halves 40*a* and 40*b* as illustrated in FIG. 9 and pivotally mounted on the shaft 109. Sets of four teeth 114 at the end of each pawl half are offset from one another by half their pitch. Being of the same pitch as the teeth on the rack 42, only one set of teeth can engage the rack at a single time as illustrated in FIG. 8. Moving the carriage 24 one-half the distance of tooth pitch will allow the other set to engage the rack 42 and not the set previously engaging the rack. Both halves of the pawl 40 are operated by the same actuator 110 which disengages both halves during seek operations.

Figure 10:
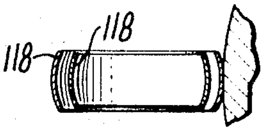
FIG. 10 is a partial sectional end view of the beryllium connector strips taken along line 10–10 of FIG. 10.

The linear drive to the carriage and head-arm assembly is derived from a drive motor 30 which converts electrical energy directly into linear motion. A wire-wound cylindrical armature or bobbin 34 is encased in a stationary permanent magnet housing 32. The bobbin 34 which is secured to the carriage by tabs 36 is free to move in and out of the end of the magnet through a hole 116 in a faceplate 117 of the magnet housing 32. Current is supplied to the bobbin coil through two beryllium strips 118 connected at one end to terminals 119 on the frame and at the other end to terminals 121 on the armature 34. As indicated in FIG. 10, the strips 118 are resilient and provided with a transverse curvature which enables the strips to maintain a constant spatial relationship to one another as the bobbin 34 is longitudinally moved in and out of the magnet housing 32.

The curved cross section of the strips 118 is substantially formed into an arc. Normally, when the ends of a flat strip are looped to point in the same direction the strip will define a semicircle. When the cross section of the strip is curved, the strip when looped will define a "U" with substantially straight and parallel sides. The radius of longitudinal curvature, and hence, the distance between parallel sides, can be varied by altering the relationship of strip width to radius of cross-sectional curvature. As an alternative to beryllium or metallic strips, the strip 118 may be formed from a nonconducting flexible material with a small conductor such as a thin wire or vapor deposit longitudinally attached internally or to one of the faces of the strip. The particular formation of the strips allows the bobbin 34 to rapidly move in relation to the magnet housing 32 without fouling input leads.

OPERATION OF DRIVE MOTOR AND DETENT MECHANISM

The position of the carriage 24 and hence the position of the recording heads 18 in the disc pack 12 is detected by a variable reluctance transducer 120. The transducer 120 is positioned opposite the detent rack 42 near the end of the detent pawl 40. The transducer 120 is wired with two primary and two secondary coils spaced such that when one primary is opposite a tooth of the rack the other primary is opposite a valley. Each primary is coupled with a secondary which is opposite a valley when its coupled primary is opposite a tooth. As the detent rack 42 passes the reluctance transducer 120, each tooth is counted twice indicating each position that the carriage 24 can be stopped by the double acting pawl 40.

Figures 11, 12:
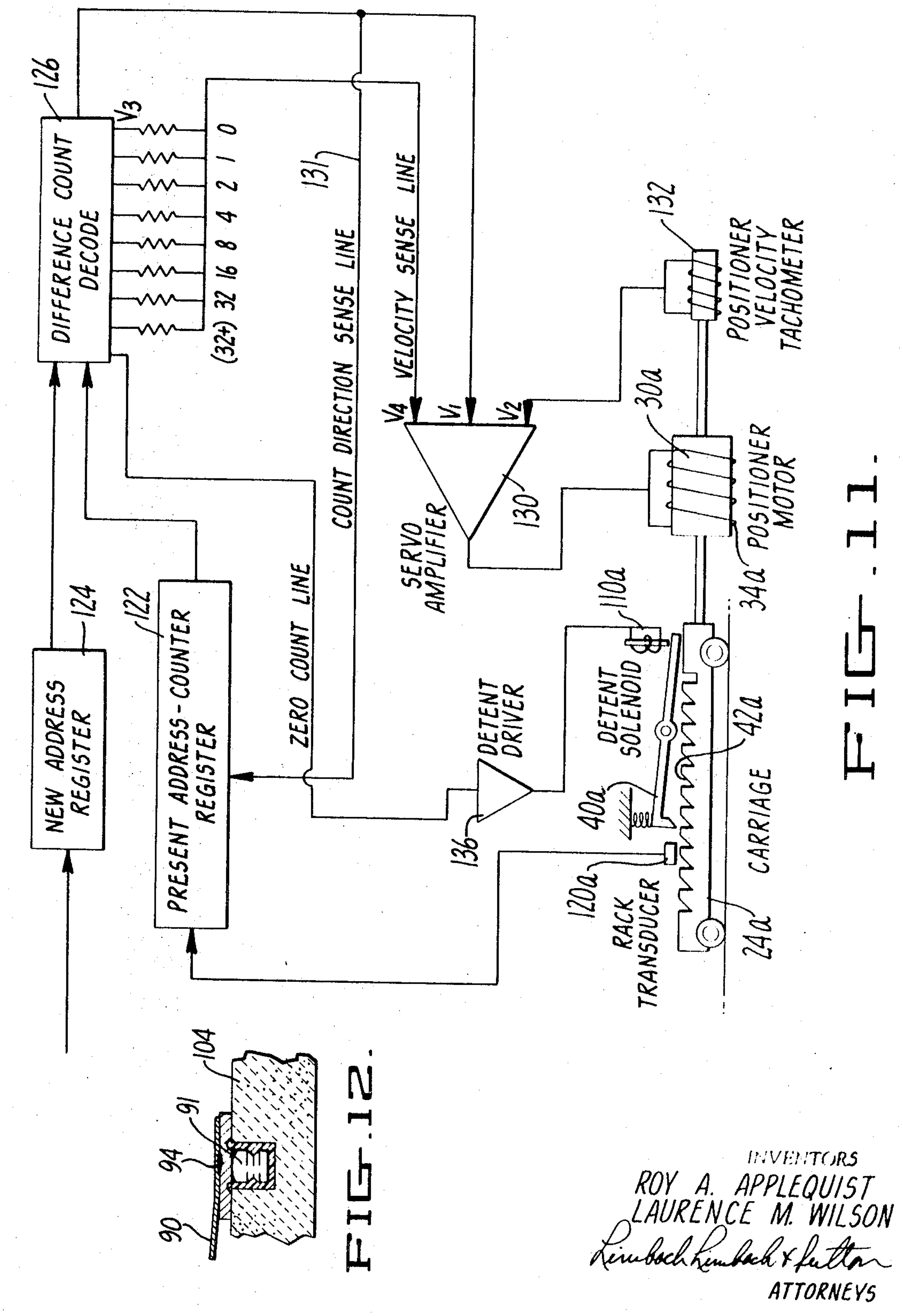
FIG. 11 is a block diagram of the components in the linear positioning mechanism.
FIG. 12 is a sectional view of the mounting for a ceramic head taken along the plane indicated at 12–12 in FIG. 2.

Turning to the block diagram of FIG. 11, the corresponding components in FIGS. 1 through 10 will retain their previous numerical designation with the added letter *a* . The transducer 120*a* conveys a signal representing the present address of the recording heads to a present address register 122.

Once the drive unit has been prepared for read/write or other commands, a seek operation is commenced by entering a new address in the new address register 125. A digital input of the new address location and a correlating digital input from the present address register are entered into an adder or difference count decode 126.

The difference count decode 126, sums the input analogs and determines the number of positions or recording cylinders that the recording head bank 22 must travel to reach the new address. The direction of travel, either toward the disc pack spindle 16 or toward the first recording cylinder 128, FIG. 1, on the periphery of a disc pack recording surface 14, is determined by whether the sum of address analog addition is a positive or a negative number. Direction of travel is determined by the polarity of the voltage produced on line $V_1$ which controls the polarity of the input to the bobbin 34 of the drive motor 30.

The difference count decode 126 develops a voltage analog $V_4$ functional to the number of cylinders that the carriage 24*a* must travel. This voltage $V_4$ determines the desired velocity at which the bobbin and heads should travel toward the new address track. The voltage $V_4$ and the desired velocity are maximum where more than 32 tracks must be crossed, and they decrease in increments as the heads approach to within 32, then 16, then 8, etc. tracks from the new address.

A positioner velocity tachometer 132, FIG. 1, 132*a*, FIG. 11, generates a voltage $V_2$ proportional to the actual velocity of the bobbin 34 and heads 90. This voltage $V_2$, generated by the tachometer 132*a* and the voltage $V_4$ from the decoder 126, are compared in a servoamplifier 130 to generate an error signal which is delivered by the servoamplifier 130 to the bobbin 34. The error signal from the servoamplifier thus causes the seek velocity of the heads to approach the seek velocity determined by the difference count decoder, showing the heads down as they approach the new address, and when the decoder reaches zero, detent driver 136 pulses the operator 110 to lock the rack 42 and pawl 40.

Alternatively, the head positioning apparatus illustrated in FIG. 1 may be operated without the use of a detent pawl and rack. Essentially, all of the apparatus is identical to that hereinbefore disclosed except that the detent mechanism is removed, and a double transducer 101 is added. The double transducer 101, FIG. 4 is mounted adjacent to the read/write transducer 100 on a line tangent to disc travel. In the preferred embodiment of this modification, the double transducer 101 is mounted on a single head in the head bank 20 and cooperates with a control disc having permanent control tracks fixed at the desired locations on the surface of the disc. The control disc may also be concurrently used for information storage if an overlay process known in the art is employed to top the permanent control surface with an erasable read/write surface.

The double transducer 101 comprises two adjacent component transducers 101*a* and 101*b* having opposite windings and is mounted to the recording head just ahead of the read/write transducer 100 with respect to relative disc travel. The component transducers 101*a* and 101*b* are equal in width, each covering approximately one-half of a control track when the double transducer 101 is centered over the control track. When each of the two component transducers is coupled to a rectifier and then to a differential amplifier a resultant signal will be developed whenever, because of an offcenter tracking, the induced current in one transducer, i.e. 101*a*, exceeds that induced in the complementary transducer 101*b*. This signal may be modulated to provide a corrective drive input to the servoamplifier 130 to maintain a fixed tracking of the read/write transducers 100 in the head bank 20. Direction of track displacement determines the direction of current supplied the positioner or drive motor 30*a* for the necessary corrective carriage movement to provide a servo lock on a selected storage cylinder in place of the mechanical lock provided by the detent pawl.

In storage systems employing the nonreturn-to-zero recording method, any single information recording track or an average of all recording tracks, if all heads contain an added double transducer 101, may provide the suitable control tracking instead of permanent control tracks to generate corrective signals to the drive motor 34*a*. The permanent control tracks, however, provide a more reliable servo guide for disc packs that are repeatedly erased and recorded.

When the double transducer 101 is passed laterally across a control track, a signal in the shape of a cycle is generated. In moving from one control track to an adjacent track one-half a sinsoidal cycle is generated while leaving the track, no signal is generated while between tracks and the complementary half cycle is generated while entering and centering on the adjacent track. With the output of the differential amplifier connected through a frequency halver during a new address seek condition, this creates a workable input signal to the present address register 122 to operate the drive motor 30*a* in the same manner as previously described.

When a new address is entered into the new address register 124, the servo lock input to the servoamplifier 130 for fixed-tracking is gated by the resultant input from the repositioning operation in FIG. 11 with the double transducer 101 replacing the rack transducer 120*a*. When zero count is reached, the signal from the difference count decode 126 which previously deactivated the detent driver 136, now in the modified system, reactivates the servo lock for fixed tracking.

Illustrated herein is the preferred embodiment of our invented linear positioning unit. One modification of the preferred embodiment is included as an example of the many variations that may be made to the basic unit without departing from the scope of the invention as more broadly defined in the following claims.

I claim:

1. A drive motor for the linear positioning of a magnetic recording head, having a stationary permanent magnet and a movable wire-wound armature that evaporated with the permanent magnet to produce a relative linear motion between magnet and armature when the armature is supplied with an electrical current, a stationary junction mount mounted in fixed position with respect to said magnet, a movable junction mount on said armature electrically connected thereto, and a flexible bus connector for electrically connecting said stationary and movable junction mounts comprising a thin, flat, elongated strip of high resiliency with an electrical conductor running longitudinally from end to end and with a curved cross section substantially defining an arc, said strip fixed at one end to said stationary junction mount and fixed at the other end to said movable junction mount with the end portions of said strip parallel and pointing in substantially identical directions and in the direction of relative movement of said magnet and armature.

2. The flexible bus connector of claim 1 further characterized by the strip being comprised of a metallic, electrically conductive material.

UNITED STATES PATENT AND TRADEMARK OFFICE

Certificate

Patent No. 3,586,891 Patented June 22, 1971

Roy A. Applequist & Laurence M. Wilson

Application having been made by Roy A. Applequist and Laurence M. Wilson, the inventors named in the patent above identified, and Memorex Corporation, Clara, Calif., a corp. of Calif., the asignee, for the issuance of a certificate under the provisions of Title 35, Section 256, of the United States Code, deleting the name of Laurence M. Wilson as a joint inventor, and a showing and proof of facts satisfying the requirements of the said section having been submitted, it is this 28th day of July 1981, certified that the name of the said Laurence M. Wilson is hereby deleted from the said patent as a joint inventor with the said Roy A. Applequist.

Fred W. Sherling
*Associate Solicitor.*